United States Patent [19]
Mathews et al.

[11] Patent Number: 5,943,177
[45] Date of Patent: Aug. 24, 1999

[54] MR HEAD READ SIGNAL PRECONDITIONING CIRCUITRY FOR REDUCING PULSE -TO-PULSE BASELINE DISTORTION

[75] Inventors: Harlan Mathews, Boulder; Michael McNeil, Nederland; Roger G. Bailey, Longmont, all of Colo.

[73] Assignee: Maxtor Corporation, Longmont, Colo.

[21] Appl. No.: 08/451,489

[22] Filed: May 26, 1995

[51] Int. Cl.$^6$ ..................................................... G11B 5/35
[52] U.S. Cl. ............................................. 360/65; 360/32
[58] Field of Search .................... 360/32, 65, 46, 360/40, 45, 113, 39, 77.02; 330/107, 253; 341/59; 381/1; 332/124; 369/54

[56] References Cited

U.S. PATENT DOCUMENTS

| | | | |
|---|---|---|---|
| 3,882,540 | 5/1975 | Ottesen | 360/39 |
| 4,017,903 | 4/1977 | Chu | 360/40 |
| 4,202,017 | 5/1980 | Geffon et al. | 360/45 |
| 4,346,412 | 8/1982 | Conley | 360/46 |
| 4,477,849 | 10/1984 | Berger | 360/77.02 |
| 4,926,144 | 5/1990 | Bell | 332/124 |
| 5,079,514 | 1/1992 | Mijoskovic | 330/253 |
| 5,101,395 | 3/1992 | Cardero et al. | 369/59 |
| 5,309,295 | 5/1994 | Bailey et al. | 360/66 |
| 5,367,409 | 11/1994 | Ottesen et al. | 360/32 |
| 5,367,411 | 11/1994 | Nishiyama et al. | 360/66 |

FOREIGN PATENT DOCUMENTS

| | | |
|---|---|---|
| 61-008776 | 1/1986 | Japan . |
| 61-261917 | 11/1986 | Japan . |
| 1-023613 | 1/1989 | Japan . |
| WO 96/18189 | 6/1996 | WIPO . |

OTHER PUBLICATIONS

Ottesen et al., "Adaptive DC Restoration", IBM Technical Disclosure Bulletin, all pages, May 1973.

Su et al., "Track Edge Phenomena in Thin Film Longitudinal Media," *IEEE Transactions on Magnetics*, vol. 25, No. 5, Sep. 1989, pp. 3384–3386.

*Primary Examiner*—Aristotelis M. Psitos
*Assistant Examiner*—Patrick Wamsley
*Attorney, Agent, or Firm*—Sheridan Ross P.C.

[57] ABSTRACT

The present invention relates to circuitry for processing an analog read signal, such as a signal produced by a magnetoresistive head, in a magnetic data storage system. The circuitry processes the analog signal before the signal reaches the detector which converts the analog signal into a digital signal representative of the data originally stored on the magnetic medium. In one embodiment, the invention comprises circuitry for equalizing the amplitudes of the positive and negative pulses in the analog read signal. In another embodiment, the invention comprises circuitry for reducing the baseline shift of the analog read signal. The invention may be used in magnetic data storage systems using any conventional data detection method.

30 Claims, 7 Drawing Sheets

MR HEAD READ SIGNAL PRECONDITIONING CIRCUITRY FOR REDUCING PULSE-TO-PULSE BASELINE DISTORTION

FIELD OF THE INVENTION

The invention relates generally to magnetic data storage systems and, more specifically, to read signal preconditioning circuitry for use in such systems.

BACKGROUND OF THE INVENTION

Use of magnetic media for mass storage of digital data in a computer system is widespread. Digital data is generally stored on a magnetic medium in the form of magnetic polarity inversions induced into the surface of the medium. If the medium is a magnetic disk, for example, the data is usually arranged in a series of concentric annuluses on the disk's surface, known as tracks. To read data from one of these tracks, the disk is rotated at a constant speed, and a magnetic transducer is brought near the rotating track to convert the alternating magnetic field emanating from the track surface into an analog electrical signal. One type of magnetic transducer which is widely used for reading digital data from a magnetic medium is a magnetoresistive (MR) head.

An MR head is a device whose resistance varies with the applied magnetic field. In this regard, the head is capable of converting magnetic field variations produced by a rotating track into a time varying voltage or current in an electrical circuit. MR heads offer many advantages over other types of magnetic transducers and, consequently, are increasingly being used in magnetic data storage systems. For example, MR heads are more sensitive than other types of read heads, such as thin film heads, and produce a stronger read signal. Also, MR heads have a better frequency response than other types of heads which use inductive coils as a sensing means. In addition, the read signal produced by an MR head is relatively insensitive to the relative velocity between the head and the medium, as is the case with other types of heads, because it is the level of the applied magnetic field which is sensed by an MR head and not the rate of change of magnetic flux lines through a coil. This is an advantage in systems where head/medium velocity may vary over a significant range. Lastly, because MR heads are not capable of writing data on a magnetic medium, magnetic data storage systems which use MR read heads must include a separate head to perform the write function. Using a separate head for reading and writing allows each head to be separately optimized for performing its singular task which can greatly improve the performance of a magnetic data storage system.

As illustrated in the characteristic of FIG. 1, the relationship between the resistance of an MR head and the applied magnetic field is nonlinear. This nonlinear characteristic can produce problems in the conversion of the magnetic field variations emanating from the medium into the time varying electrical signal. For example, the nonlinear nature of the MR head may cause the time varying electrical signal produced by the head to look nothing like the magnetic signal applied to the head. To overcome this problem, a bias current is generally applied to the head to move the quiescent operating point of the head to a more linear region of the resistance characteristic. With reference to FIG. 1, it is seen that maximum linearity in the operation of an MR head is obtained by biasing the head at point A, i.e., the most linear point on the characteristic. It may be desirable, however, to bias the head at another point, such as point B or point C, to maximize a conversion parameter which may be more important than linearity, such as signal to noise ratio (SNR). As a consequence of such biasing, the output signal of the head may be asymmetrical about a zero volt baseline, such as output waveform 10 in FIG. 1 corresponding to bias point B. In addition to biasing effects, other factors may also exist which result in an asymmetrical read signal, such as off-track effects.

Because of the high data densities being stored on magnetic media today, read signals are comprised of relatively narrow electrical pulses and read signal asymmetry can make detection of the stored data bits difficult. For example, in a disk drive using a peak detector, the difference in the magnitude of the positive and negative peaks of the read signal complicates, among other things, the setting of the threshold levels used in detecting the peaks. Alternatively, in a disk drive using a partial response maximum likelihood (PRML) channel, the difference in the magnitudes of the positive and negative peaks of the read signal complicates the sampling of the signal which must be performed before maximum-likelihood detection can occur. A need therefore exists for an apparatus which is capable of overcoming the problems created by an asymmetrical read signal produced by an MR head.

In addition to the above-described asymmetry, MR heads are also known to produce a shift in the baseline of the signal read from the magnetic medium. FIG. 2 illustrates a read signal having such a baseline shift 12. It has been proposed that this baseline shift 12 is caused by the presence of parasitic magnetic dipoles along the edges of the data track which are sensed by the MR head during readback. An expanded discussion of this phenomena can be found in "Track Edge Phenomena in Thin Film Longitudinal Media," IEEE Transactions on Magnetics, Vol. 25, No. 5, September 1989, by Su et al. In addition, shifted baselines may also be present in read signals produced by other types of heads, such as thin film heads. As with asymmetrical peaks, the presence of shifted baselines can complicate the detection of the data stored on the magnetic medium. A need therefore exists for an apparatus which is capable of overcoming the problems created by the baseline shift of the read signal.

SUMMARY OF THE INVENTION

The present invention relates to an apparatus for preconditioning a read signal produced by a magnetoresistive (MR) head, before performing detection, to reduce the problems associated with pulse asymmetry and baseline shift. In one embodiment, the invention is capable of correcting the amplitude asymmetry of a read signal before the signal is detected. In another embodiment, the invention is capable of removing baseline shift from a read signal before the signal is detected. In this regard, the invention is capable of increasing the reliability, i.e., decreasing the read error rate, of magnetic data storage systems using conventional detection methods.

In one aspect of the present invention, a magnetic data storage system is provided which includes signal preconditioning circuitry for reducing read signal distortions, namely baseline shift and positive and negative pulse amplitude asymmetry. More specifically, this aspect of the invention includes: a magnetic medium, a magnetic head for sensing data stored on said medium and for creating an analog read signal, detection circuitry for converting the analog read signal into a digital signal representative of the data stored on the magnetic medium, and read signal preconditioning circuitry located between the head and the detection circuitry for reducing distortions in the read signal before the read signal reaches the detection circuitry.

The magnetic medium may include any magnetic material capable of storing data, such as magnetic tape, floppy disks, and hard disks. The magnetic head may include, for example, a thin film head, a ferrite head, or, most preferably, a magnetoresistive head. The detection circuitry can include any circuitry capable of converting an analog read signal into a digital signal representative of data stored on the magnetic medium, such as PRML circuitry, peak detection circuitry, or decision feedback channel circuitry.

In one embodiment, the preconditioning circuitry comprises a baseline shift reduction circuit for reducing the baseline shift created by the head during reading. In another embodiment, the preconditioning circuitry comprises pulse asymmetry reduction circuitry for reducing the asymmetry of the read signal, around a zero-volt baseline, created by the head. In yet another embodiment, the preconditioning circuitry may include both baseline shift reduction circuitry and pulse asymmetry reduction circuitry.

In another aspect of the present invention, circuitry is provided for equalizing the amplitudes of the positive and negative pulses of a read signal created by an MR head. More specifically, this aspect of the invention includes: a magnetic medium; a magnetoresistive (MR) head for reading data from the medium and for creating a read signal wherein the amplitude, with respect to a zero voltage baseline, of the positive and negative peaks of the read signal are unequal; and circuitry for equalizing the amplitudes of the positive and negative peaks of the read signal. The circuitry for equalizing the amplitudes of the positive and negative peaks may include, for example, a transconductance multiplier such as the well known Gilbert cell multiplier. In another embodiment, the circuitry for equalizing may include circuitry for separating the positive peaks of the read signal from the negative peaks of the read signal and/or circuitry for separately adjusting the amplitudes of the positive and negative peaks. The circuitry for equalizing may also include circuitry for recombining the positive and negative peaks after their amplitudes have been separately adjusted.

In a third aspect of the present invention, circuitry is provided for reducing the baseline shift of the read signal. More specifically, this aspect of the invention includes: a magnetic medium; a magnetic head for reading data from the medium and for creating a read signal with a undesired baseline shift; and circuitry for reducing the baseline shift of the read signal. The magnetic head may include, for example, a thin film head, a ferrite head, or, most preferably, a magnetoresistive head. The circuitry for reducing the baseline shift may include circuitry for providing low frequency boost and/or phase shift to the read signal. In another embodiment, the circuitry for reducing the baseline shift may include frequency discrimination circuitry such as, for example, reactive filtration circuitry. This embodiment may also include amplification circuitry for amplifying the read signal after it has passed through the frequency discrimination circuitry.

DETAILED DESCRIPTION

The present invention relates to an apparatus for preconditioning a read signal produced by a magnetoresistive head, before performing detection, to reduce the problems associated with pulse asymmetry and baseline shift. The invention is useful in any magnetic data recording system where pulse asymmetry and baseline shift cause detection problems.

Figure 3:
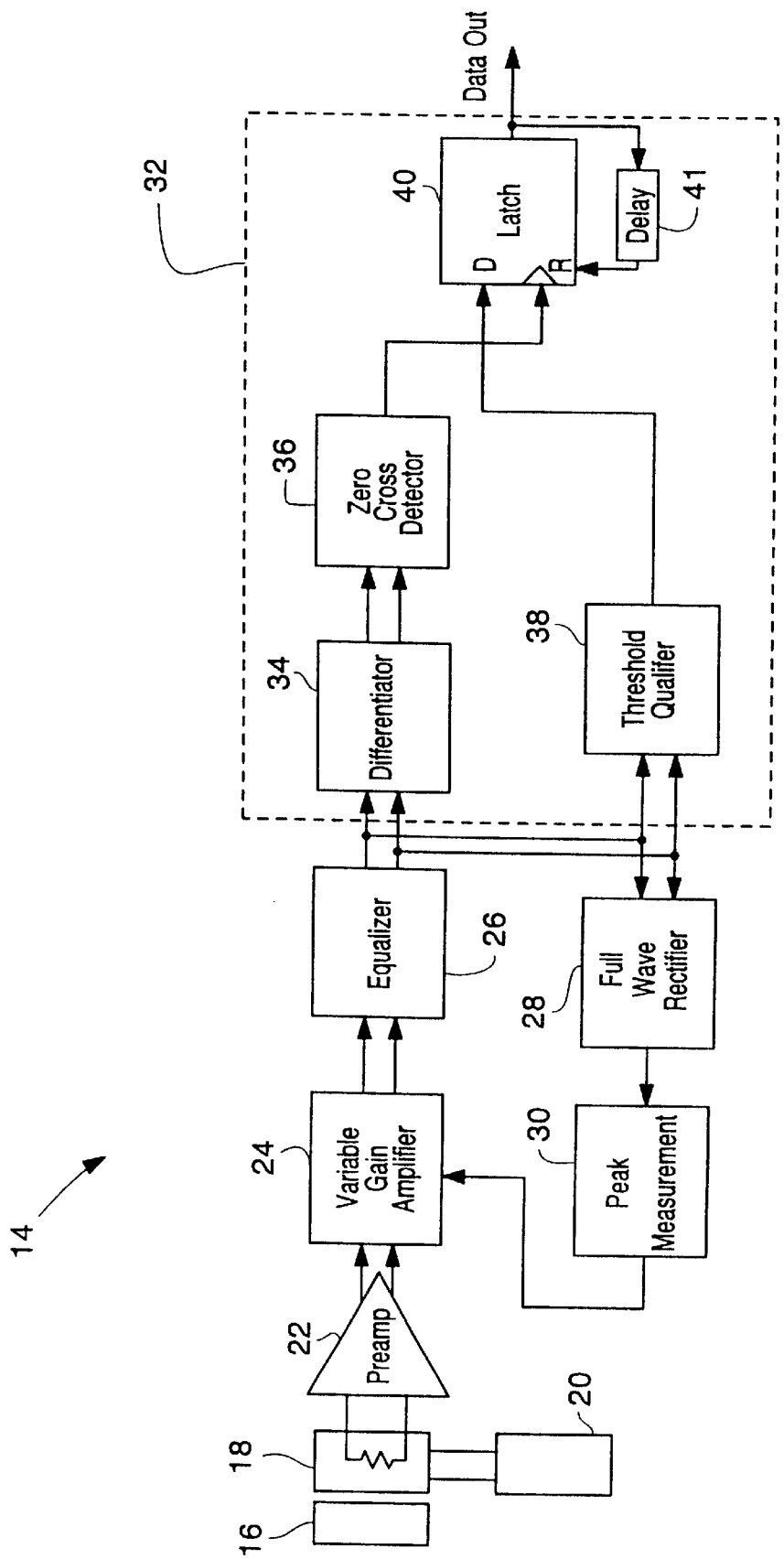
FIG. 3 is a block diagram illustrating a typical magnetic data recording system which may be modified to include the present invention.

FIG. 3 illustrates a typical magnetic data recording system which may be modified to include the present invention. For convenience, the system of FIG. 3 will be referred to by reference numeral 14. As illustrated in the figure, system 14 includes: a magnetic medium 16, a magnetoresistive (MR) head 18, head biasing circuitry 20, a preamplifier 22, a variable gain amplifier (VGA) 24, an equalizer 26, a full wave rectifier 28, peak measurement circuitry 30, and transition detection circuitry 32. The magnetic medium 16 stores digital data in the form of magnetic polarity transitions and may include, for example, a magnetic tape, a floppy disk, or a hard disk. The magnetoresistive head 18 senses the magnetic polarity transitions of the magnetic medium and creates an analog signal, known as a read signal, which is representative of the transitions on the medium 16. The head biasing circuitry 20 is coupled to the MR head for adjusting the bias current to the head. The preamplifier 22 receives the read signal from the head 18 and performs the first stage amplification of the signal. The VGA 24, equalizer 26, full wave rectifier 28, and peak measurement circuitry 30 collectively receive the read signal from the preamplifier 22 and linearly process it into a form which simplifies the transition detection process. The transition detection circuitry 32 receives the processed read signal and transforms it into a digital data signal representative of the magnetic transitions on the magnetic medium 16, i.e., a logic one represents a transition and a logic zero represents the lack of a transition, or vice versa.

With reference to FIG. 3, the head biasing circuitry 20 may be used to adjust the bias current to the MR head 18 to optimize the performance of the head 18 with respect to a specific criterion. In the preferred embodiment of the present invention, for example, the head biasing circuitry 20 biases the head in a nonlinear region of the head's resistance characteristic to maximize the signal to noise ratio of the read signal. The preamplifier 22 receives the read signal from the MR head 18 and linearly amplifies the signal to an acceptable level for processing by the VGA 24. The variable gain amplifier 24 receives the read signal from the preamplifier 22, linearly amplifies the read signal to a specific level required by the transition detection circuitry 32 and defined by a gain feedback signal, and provides the amplified signal to the equalizer 26. The equalizer 26 receives the amplified read signal from the VGA 24 and linearly processes the signal to compensate for certain media/head effects not specific to magnetoresistive heads. The equalizer may also perform other functions which aid in the detection of the transitions, such as pulse slimming. The processed signal is then provided to the transition detection circuitry 32 and the full wave rectifier 28.

The full wave rectifier 28 and the peak measurement circuitry 30 are used to create the gain feedback signal which is used by the variable gain amplifier 24. The full wave rectifier 28 receives the equalized read signal from the equalizer 26 and full wave rectifies it to produce a signal having pulses of a single polarity. The peak measurement circuitry 30 measures the peak amplitude of this single polarity signal and uses the measurement to create a gain feedback signal which is delivered to an input of the variable gain amplifier 24. The variable gain amplifier 24 then uses the gain feedback signal to adjust its gain to produce an output signal at the specific level required by the transition detection circuitry 32.

As mentioned previously, the transition detection circuitry 32 transforms the equalized read signal into a digital data signal representative of the magnetic transitions on the magnetic medium 16. A number of different methods of performing transition detection exist, such as peak detection and partial response/maximum likelihood (PRML) detection. In FIG. 3, the transition detection circuitry 32 is configured to perform peak detection. It should be appreciated that the present invention may be used in magnetic recording systems using any method of transition detection.

With reference to FIG. 3, the transition detection circuitry 32 may include: a differentiator 34, a zero cross detector 36, a threshold qualifier 38, and a latch 40. The differentiator 34 receives the equalized read signal from the equalizer 26 and creates an output signal representative of the slope of this signal. The output signal of the differentiator 34 is then delivered to the zero cross detector 36 which creates an output signal indicative of when the output signal of the differentiator crosses the zero voltage level. The threshold qualifier 38 also receives the equalized read signal from the equalizer. The threshold qualifier 38 creates an output signal indicative of when the absolute value of the equalized read signal exceeds a predetermined threshold level. The latch 40 receives the output signals of both the zero cross detector 36 and the threshold qualifier 38. The output of the zero cross detector is applied to the clock input of the latch while the output of the threshold qualifier is applied to the data input. The latch, therefore, latches the level of the threshold qualifier output signal whenever the zero cross detector has detected a zero crossing of the differentiated read signal, i.e., whenever a peak occurs in the equalized read signal. The output of the latch 40 is then fed back to a reset input terminal of the latch 40 through a delay block 41 having a length of approximately one-half the detection window, which resets the latch 40 thereby creating a pulse output. In this regard, whenever a zero crossing occurs, the latch will output a pulse if the absolute peak value of the read signal is greater than the predetermined threshold level and a logic low if the absolute peak value of the read signal is below the predetermined threshold level. The digital output signal of the latch 40 will thereby represent the magnetic transitions stored on the magnetic medium 16.

Figure 4:
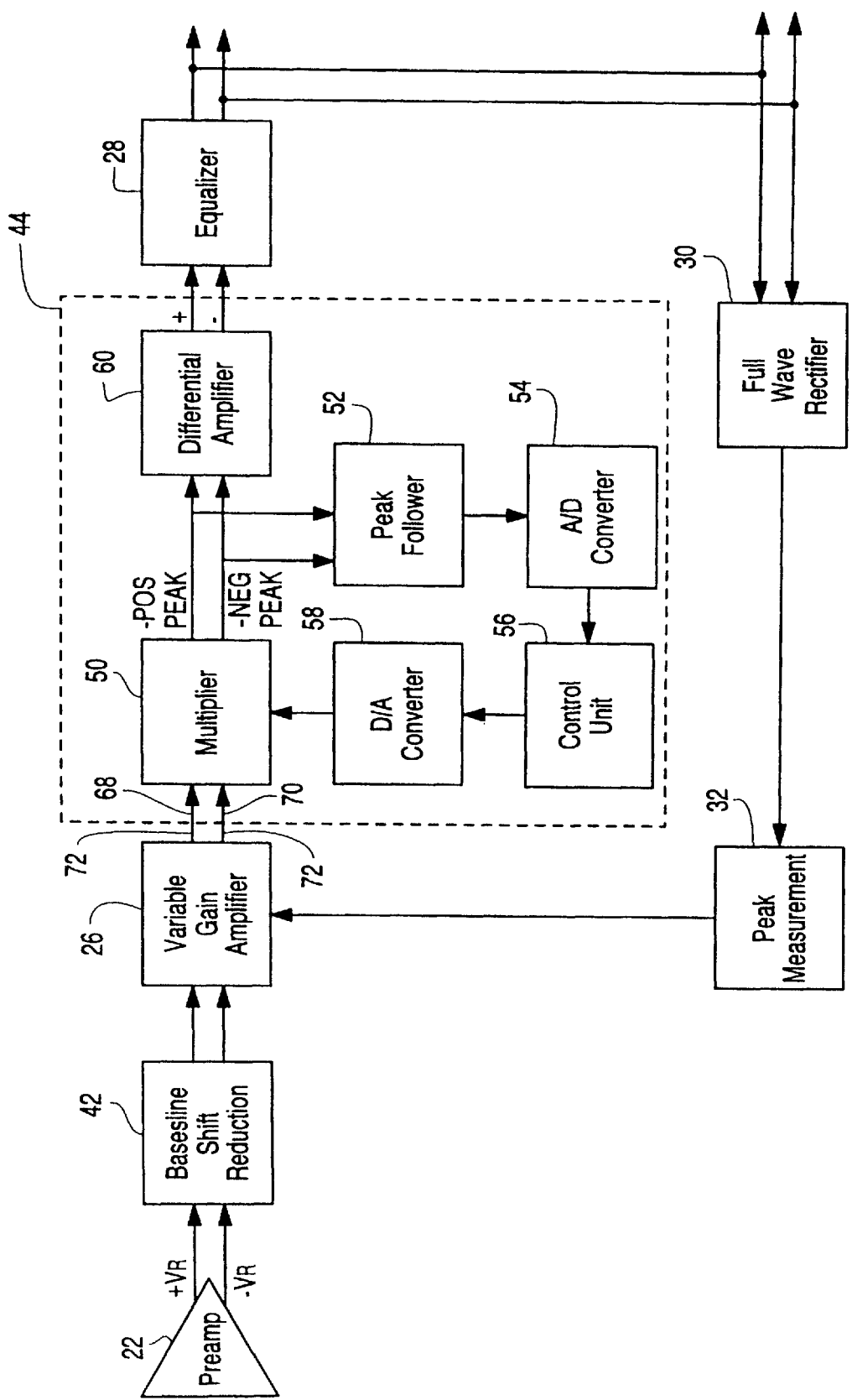
FIG. 4 is a block diagram illustrating one embodiment of the present invention as implemented in the magnetic data recording system of FIG. 3.

In one embodiment of the present invention, as illustrated in FIG. 4, the magnetic data storage system 13 of FIG. 3 is modified to include baseline shift reduction circuitry 42 and pulse asymmetry reduction circuitry 44. This additional circuitry processes the read signal before it reaches the transition detection circuitry 32 to improve the reliability of the detection process.

Figure 5A:
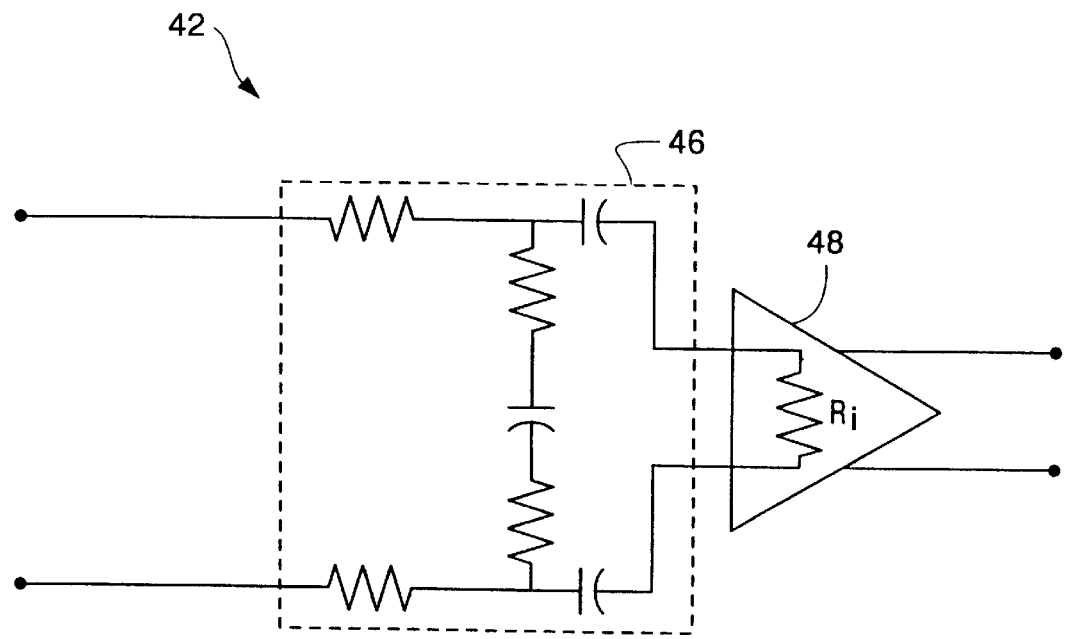
FIG. 5A is a schematic diagram illustrating one embodiment of the baseline shift reduction circuitry of FIG. 4.

FIG. 5A illustrates one embodiment of the baseline shift reduction circuitry 42 of FIG. 4. The circuitry 42 includes RC network 46 coupled to the input of differential amplifier 48. When combined with the input resistance $R_i$ of the differential amplifier 48, RC network 46 comprises a reactive filtration circuit with a predetermined frequency response. The differential amplifier 48 is operative for amplifying the filtered read signal. To reduce the baseline shift of the read signal received from the preamplifier 22, the baseline shift reduction circuitry 42 provides low frequency boost and phase shift to the signal.

Figure 1:
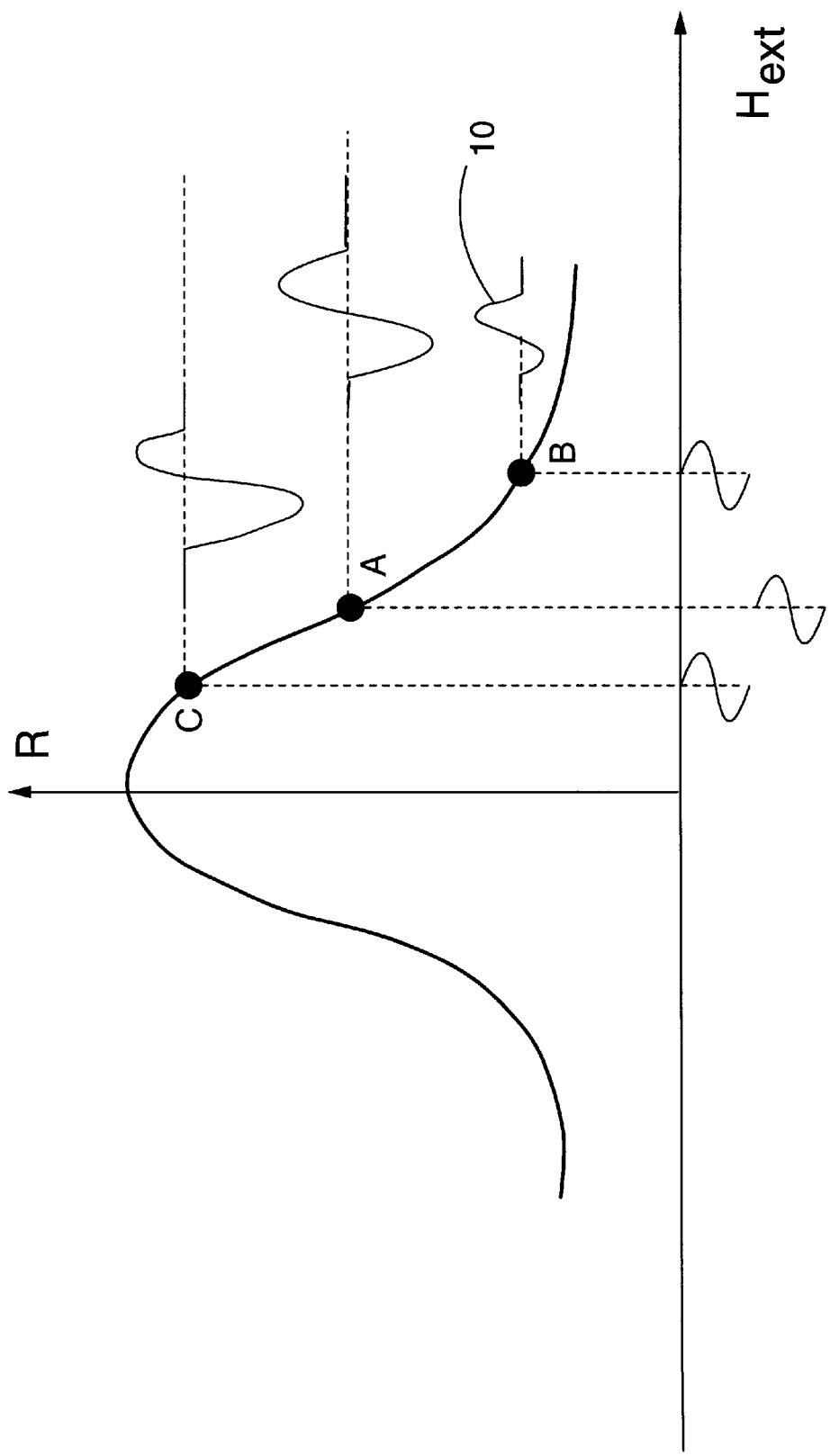
FIG. 1 is a graph illustrating a typical resistance characteristic for a magnetoresistive read head.
Figure 2:
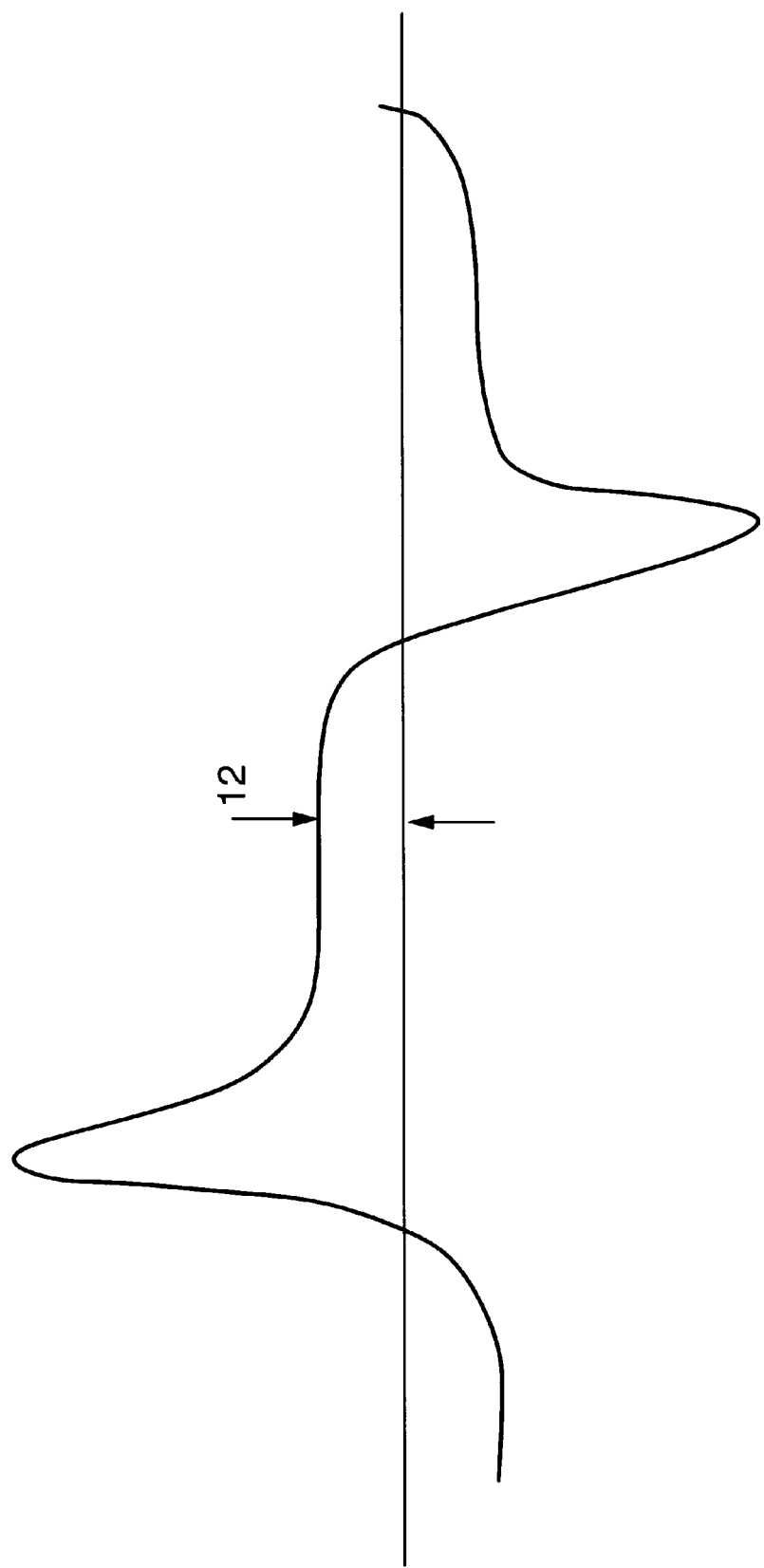
FIG. 2 is a graph illustrating a typical read signal waveform having a shifted baseline which is characteristic of waveforms created by magnetoresistive read heads.
Figure 5B:
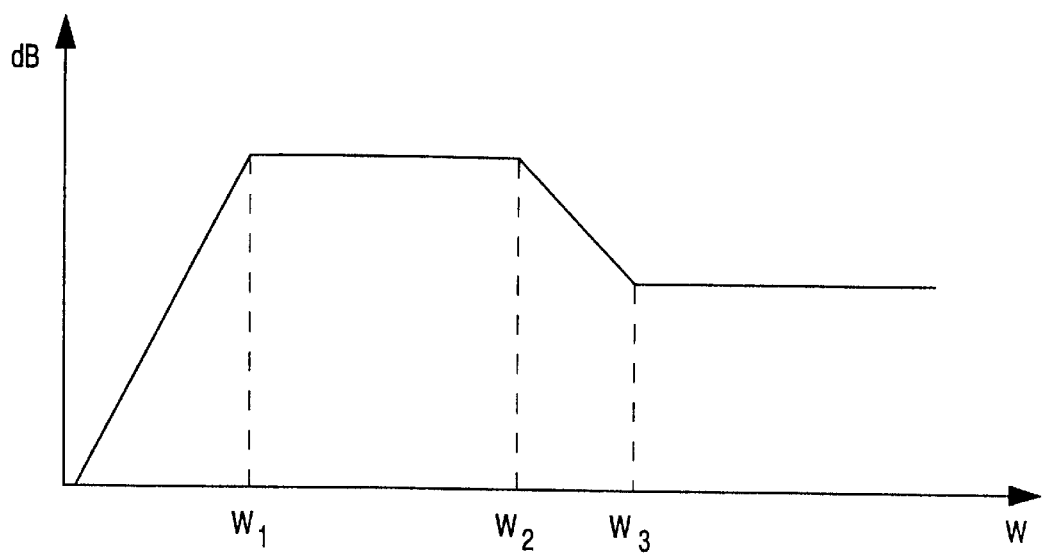
FIG. 5B is a graph illustrating the frequency response of the circuitry of FIG. 5A.

To better understand how the baseline shift reduction circuitry reduces the baseline shift, it is helpful to model a read signal pulse, such as the pulse in FIG. 2 having an uneven pre and post baseline, as an even function with a small odd function component. The pulse can be corrected, i.e. the odd function component can be reduced, by applying a phase shift (varying delay) to the read signal which is nonlinear with respect to frequency. The baseline shift reduction circuitry is operative for supplying this nonlinear phase shift to the read signal. Post pulse baseline is lowered by adding less delay to the lower frequencies, and post pulse baseline is raised by adding more delay to the lower frequencies. FIG. 5B illustrates the amplitude versus frequency response of the baseline shift reduction circuitry 42 of FIG. 5A. As seen in the figure, the frequency response has poles at frequencies $\omega_1$ and $\omega_2$ and a zero at frequency $\omega_3$. The values of circuit elements R1, R2, C1, and C2 in FIG. 5 are chosen to provide the proper poles and zeros and the proper phase shift to the read signal.

It should be appreciated that the baseline shift reduction circuitry 42 of the present invention may include any circuitry for providing the proper low frequency boost and/or phase shift to the read signal created by the head and is not limited to the specific circuitry illustrated in FIG. 5A. It should also be understood that the baseline shift reduction circuitry of the present invention is also useful in magnetic data storage systems which do not use magnetoresistive heads, such as systems that use thin film heads.

As illustrated in FIG. 4, one embodiment of the pulse asymmetry reduction circuitry 44 includes: a transconductance multiplier 50, a peak follower 52, an analog to digital (A/D) converter 54, a control unit 56, a digital to analog (D/A) converter 58, and a differential amplifier 60. The transconductance multiplier 50 receives the amplified read signal from the VGA 24, separates the positive peaks of the read signal from the negative peaks, and separately amplifies the positive and negative peaks in response to a symmetry feedback signal to equalize their amplitudes. It should be appreciated that transconductance multiplier 50 may be replaced by any circuitry capable of separately adjusting the amplitudes of the positive and negative peaks of the read signal. In addition, it should be appreciated that the transconductance multiplier 50 used in the current embodiment of the invention is not performing a multiplication of input signals but instead is being utilized for the balanced nature of its circuitry.

The combination of peak follower 52, A/D converter 54, control unit 56, and D/A converter 58 is operative for receiving the output signals from the transconductance multiplier 50 and for using these signals to create the symmetry feedback signal used by the multiplier 50. It should be appreciated that, for purposes of the present invention, the above mentioned combination for creating the symmetry feedback signal may be replaced by any circuitry capable of creating a signal indicative of the level of asymmetry which exists between the amplitudes of the positive and negative peaks of the output signal of the transconductance multiplier 50.

The differential amplifier 60 is operative for receiving the output signals from the transconductance multiplier 50 and for amplifying the difference between these signals to create a single balanced output signal having positive and negative peaks of substantially equal amplitude and reduced baseline shift. This output signal is provided to the equalizer 26 for additional processing before transition detection is performed.

Figure 6:
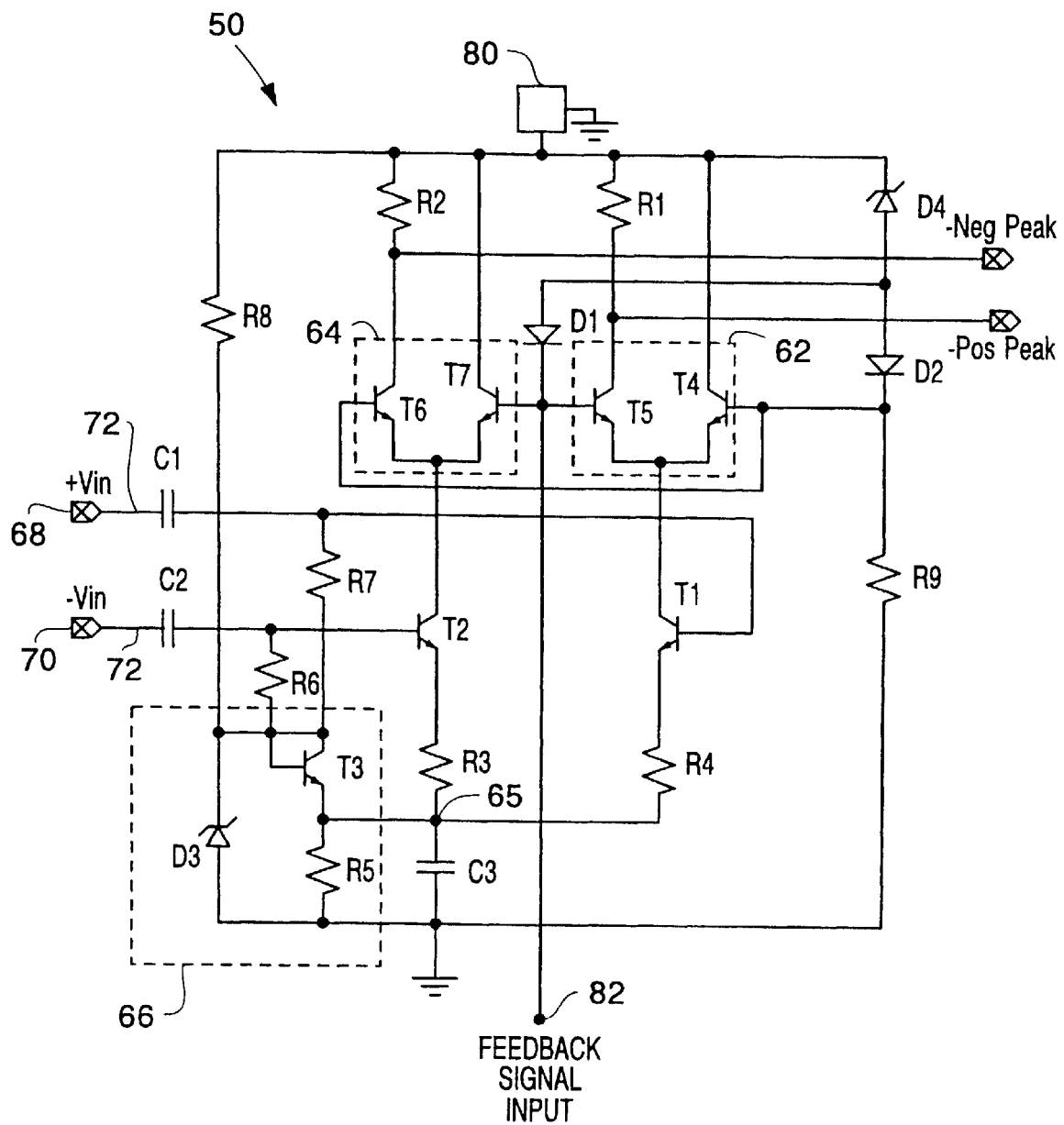
FIG. 6 is a schematic diagram ofone embodiment of the multiplier circuitry of FIG. 4.

The transconductance multiplier 50 of FIG. 4 is discussed in greater detail with respect to FIG. 6. The illustrated embodiment is a four-quadrant transconductance multiplier, better known as a Gilbert cell. It should be appreciated that other multiplier configurations, such as a two-quadrant transconductance multiplier, may be used in place of the illustrated embodiment. As seen in the figure, the transconductance multiplier 50 includes a pair of input transistors T1, T2 and a pair of balanced transistor differential amplifiers 62, 64 comprising balanced transistor pairs T4/T5 and T6/T7, respectively. The input transistors T1, T2 are each coupled at a base terminal to a corresponding leg 68, 70 of a balanced input line 72 which carries the amplified read signal from the variable gain amplifier 24. The emitter terminals of the input transistors T1, T2 are each connected through corresponding emitter resistors R3, R4 to a constant voltage node 65 created by a constant voltage source 66.

The base terminal of transistor T4 of differential amplifier 62 is connected to the base terminal of transistor T6 of differential amplifier 64. Similarly, the base terminal of transistor T5 of differential amplifier 62 is connected to the base terminal of transistor T7 of differential amplifier 64. The emitter terminals of transistors T4 and T5 of differential amplifier 62 are electrically coupled to one another, as are the emitter terminals of transistors T6 and T7 of differential amplifier 64. The coupled emitter terminals of the differential amplifiers 62, 64 are each, in turn, connected to the collector terminal of a corresponding input transistor T1, T2. The collectors of transistors T4 and T7 are each connected to a constant DC voltage source 80. The collectors of transistors T5 and T6 are each connected through a corresponding collector resistor R1, R2 to the constant DC voltage source 80. The transconductance multiplier 50 produces two output signals, one comprising the collector voltage of transistor T5 and the other the collector voltage of transistor T6.

The input transistors T1, T2 are operative for receiving the amplified read signal from the variable gain amplifier 24 and for separating the positive peaks of the read signal from the negative peaks of the read signal. The transistors T1, T2 accomplish this separation through rectification of the signals on each corresponding leg 68, 70 of the balanced input line 72. In other words, each input transistor T1, T2 attempts to draw current from its respective differential amplifier 62, 64 only when the signal on the respective leg 68, 70 of the balanced input line 72 exceeds a specific positive voltage. Accordingly, each balanced transistor differential amplifier 62, 64 only processes read signal peaks of a single polarity, i.e., differential amplifier 62 only processes positive read signal peaks and differential amplifier 64 only processes negative read signal peaks.

Each of the balanced transistor differential amplifiers 62, 64 of the transconductance multiplier 50 receives the rectified signal from its respective input transistor T1, T2 and uses it to produce a single output signal corresponding to either the negative peaks or the positive peaks of the read signal. For example, in the embodiment of FIG. 6, balanced transistor differential amplifier 62 creates an output signal corresponding to the positive peaks of the read signal based on the difference between the voltage of constant DC voltage source 80 and the voltage drop across collector resistor R1 of transistor T5. Similarly, balanced transistor differential amplifier 64 creates an output signal corresponding to the negative peaks of the read signal based on the difference between the voltage of constant DC voltage source 80 and the voltage drop across collector resistor R2 of transistor T6. As will be discussed shortly, the transconductance multiplier 50 uses the symmetry feedback signal to adjust the amplitudes of the output signals produced by the balanced transistor differential amplifiers 62, 64.

The coupled base terminals of transistors T4 and T6 are connected to constant DC voltage source 80 through junction diode D2 and zener diode D4. These coupled terminals are also connected to ground through resistor R9. This arrangement produces a substantially constant DC voltage on the coupled base terminals of transistors T4 and T6. The coupled base terminals of transistors T5 and T7 are connected to constant DC voltage source 80 through junction diode D1 and the same zener diode D4. These terminals, however, are not connected to ground via a resistor but instead are connected to a feedback signal input port 82. Feedback signal input port 82, in turn, is connected to D/A converter 58 of FIG. 4 for receiving the symmetry feedback signal in the form of a variable current. By varying this feedback current, it is possible to adjust the balance of collector current flowing through each side of each of the balanced transistor differential amplifiers 62, 64. By varying the balance of collector current flowing through each side of each differential amplifier 62, 64, one is effectively adjusting the amplitude of the output signal being produced by each differential amplifier 62, 64. Junction diodes D1 and D2 are used to linearize the operation of the multiplier 50.

With reference to FIG. 4, to create the symmetry feedback signal, peak follower 52 receives the positive and negative peak output signals from the transconductance multiplier 50 and measures which of the peak signals has the larger amplitude. The peak follower then outputs a signal indicative of the larger amplitude to the A/D converter 54. The A/D converter 54 digitizes the amplitude value from the peak follower 52 and delivers the digital value to the control unit 56. The control unit 56 is coupled at an output to the D/A converter 58 for controlling the level of feedback current delivered to the multiplier 50. Using this ability, the control unit 56 varies the amount of feedback current being delivered to the multiplier until the digital output signal of the A/D converter 54 is minimized. This minimization process assures that the amplitudes of the positive and negative peaks being output by the transconductance multiplier 50 are substantially equal. In the embodiment of the present invention illustrated in FIG. 6, the feedback current will always be in a direction away from the coupled base terminals of transistors T5 and T7, i.e., the feedback current will be reducing the base current being supplied to transistors T5 and T7. It should be appreciated, however, that slight modifications to the circuitry of FIG. 6 would allow a bidirectional feedback current to be used for greater adjustment flexibility.

Differential amplifier 60 is AC coupled to the output of the multiplier 50 for receiving the positive and negative peak output signals of the multiplier 50 and for recombining them into a single balanced signal. Differential amplifier 60 also linearly amplifies these positive and negative peak output signals. The output of the differential amplifier 60 is therefore a balanced read signal having positive and negative peaks of substantially equal amplitude.

Figure 7A:
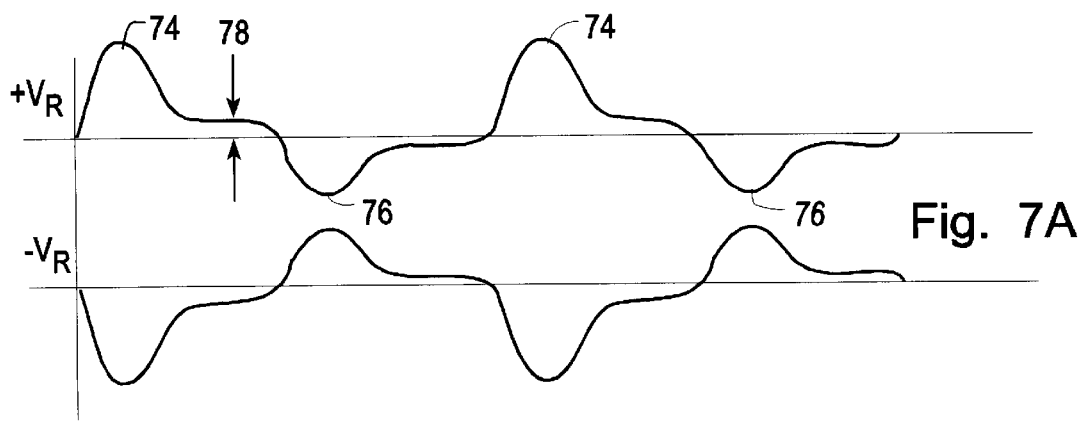
FIGS. 7A, 7B, 7C, and 7D are graphs illustrating typical waveforms at various points in the circuitry of FIG. 4.
Figure 7B:
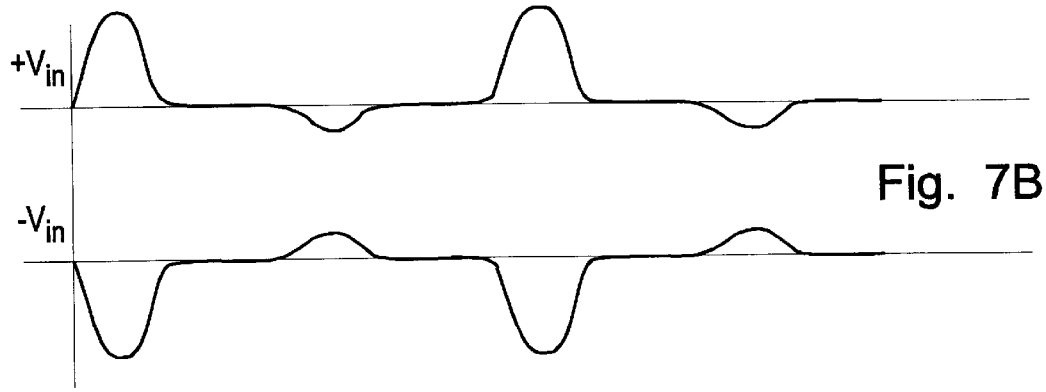
Figure 7C:
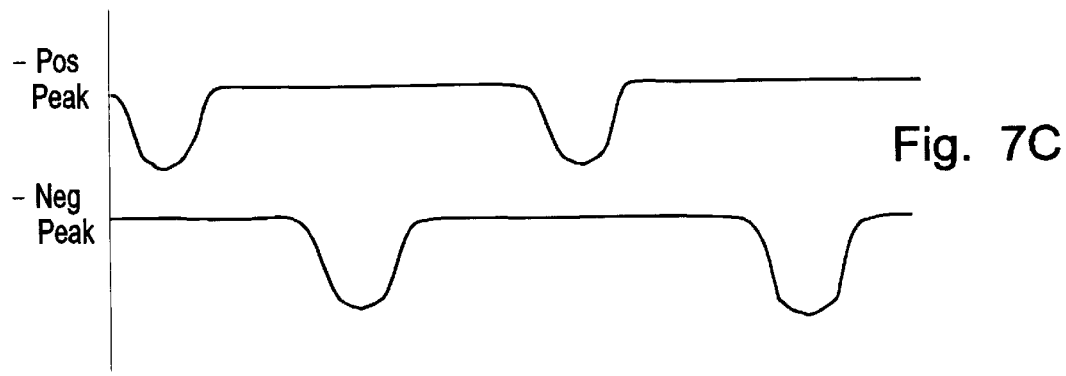
Figure 7D:
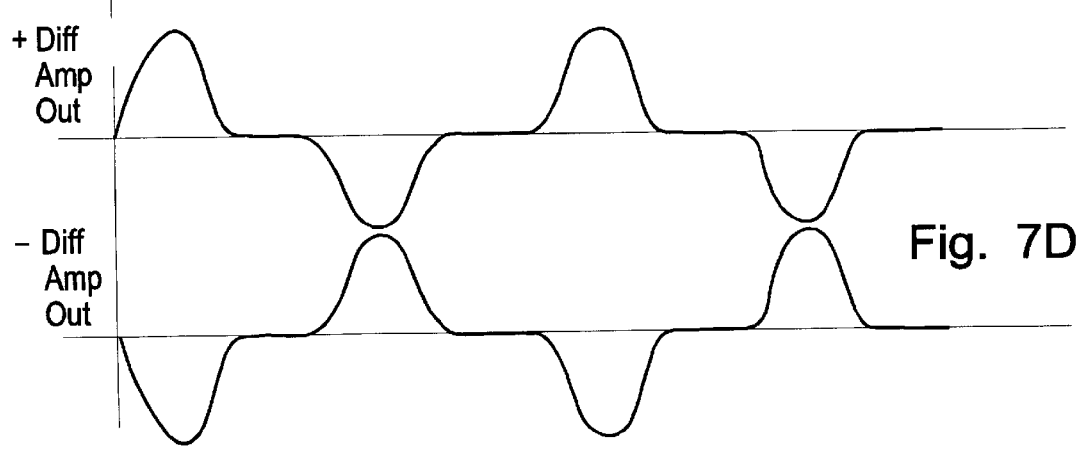

FIGS. 7A, 7B, 7C, and 7D illustrate typical waveforms at various points in the circuitry of FIG. 4. These waveforms illustrate how a raw read signal may be conditioned using the circuitry of the present invention. FIG. 7A illustrates a typical read signal waveform at the output of the preamplifier 22. As seen in the figure, the amplitude of the positive peaks 74 of the read signal waveform is greater than the amplitude of the negative peaks 76 of the waveform and the waveform includes an undesired baseline shift 78. FIG. 7B illustrates the read signal waveform at the output of the baseline shift reduction circuitry 42. This waveform has a substantially reduced baseline shift, however the peak asymmetry is still present. Because the variable gain amplifier 24 is a linear device, a waveform similar to that in FIG. 7B will be applied to the input of the transconductance multiplier 50. FIG. 7C illustrates the output signal waveforms of the transconductance multiplier 50. As seen in the figure, the amplitudes of the positive and negative peaks are equal but they are of the same polarity and therefore comprise two separate signals. These signals are applied to the input terminals of the differential amplifier 60 which amplifies the difference between the two signals to produce a single balanced output signal. FIG. 7D illustrates the output signal of the differential amplifier 60. As is apparent from the figure, the positive and negative peaks are of equal amplitude and the two illustrated waveforms comprise a single balanced signal.

It should be understood that other embodiments of the present invention exist and that the specific circuit configurations disclosed in this specification are not meant to be limiting. For example, although the baseline shift reduction circuitry 42 and the pulse asymmetry reduction circuitry 44 illustrated in FIG. 4 must be located somewhere between the magnetoresistive head 18 and the transition detection circuitry 32, they are not limited to the specific locations illustrated in FIG. 4. In addition, the invention is not limited to having both baseline shift reduction circuitry 42 and pulse asymmetry reduction circuitry 44 and may have only one of these components.

Although the present invention has been described in conjunction with its preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A magnetic storage system, comprising:
   a magnetic medium for storing data in the form of magnetic polarity transitions;
   a magnetic head for sensing a magnetic field created by said magnetic polarity transitions and for converting said magnetic field to an analog read signal said analog read signal including pulse-to-pulse baseline shift distortion, wherein a component of the distortion immediately following a positive pulse differs in polarity from a component of the distortion immediately following a negative pulse when the analog read signal is unexposed to other distortions and wherein the component of the distortion immediately following a positive pulse has a substantially constant magnitude which is substantially equal to a magnitude of the component of the distortion immediately following a negative pulse when the analog read signal is unexposed to other distortions;
   detection means for converting said analog read signal into a digital data signal which represents the data originally stored on said magnetic medium; and
   read signal preconditioning means, located between said head and said detection means, for reducing said pulse-to-pulse baseline shift distortion in said analog read signal before said analog read signal reaches said detection means, said signal preconditioning means including at least one of the following: means for providing low frequency boost to the read signal and means for providing a phase shift to low frequency components of said read signal without affecting its high frequency components.

2. The system, as claimed in claim 1, wherein:
   said magnetic medium includes one of the following: a magnetic tape, a floppy disk, and a hard disk.

3. The system, as claimed in claim 1, wherein:
   said magnetic head includes one of the following: a magnetoresistive head, a thin film head, and a ferrite head.

4. The system, as claimed in claim 1, wherein:
   said magnetic head includes a magnetoresistive head; and
   said system further includes biasing means for biasing said magnetoresistive head in a nonlinear region of a resistance characteristic for improving the signal to noise ratio of said analog read signal.

5. The system, as claimed in claim 1, wherein:
   said detection means includes one of the following: a peak detector, a PRML channel, and a decision feedback channel.

6. The system, as claimed in claim 1, wherein:
   said read signal preconditioning means includes pulse-to-pulse baseline shift reduction means having reactive frequency discrimination circuitry for filtering said analog read signal, said reactive frequency discrimination circuitry having a predetermined frequency response characterized by a first lower level of signal attenuation provided to a first lower range of frequencies in said analog read signal and a second higher level of signal attenuation provided to a second higher range of frequencies in said analog read signal.

7. The system, as claimed in claim 1, wherein:
   said read signal preconditioning means includes baseline shift reduction means having reactive frequency discrimination circuitry for filtering said analog read signal, said reactive frequency discrimination circuitry having a predetermined phase response for providing a phase shift to said analog read signal which is nonlinear with respect to frequency.

8. The system, as claimed in claim 6, wherein:
   said reactive frequency discrimination circuitry includes an RC network.

9. The system, as claimed in claim 1, wherein:
   said read signal preconditioning means includes pulse asymmetry reduction means for reducing amplitude asymmetry between positive pulses and negative pulses of said analog read signal.

10. The system, as claimed in claim 9, wherein:
    said pulse asymmetry reduction means includes a transconductance multiplier.

11. The system, as claimed in claim 9, wherein:

said pulse asymmetry reduction means includes separation means for separating said positive pulses of said analog read signal from said negative pulses of said analog read signal.

12. The system, as claimed in claim 11, wherein:

said pulse asymmetry reduction means further includes amplitude adjustment means for separately adjusting the amplitudes of said positive and negative pulses to reduce asymmetry.

13. The system, as claimed in claim 12, wherein:

said pulse asymmetry reduction means further includes recombination means for recombining said positive pulses and said negative pulses into a single signal after their amplitudes have been adjusted by said amplitude adjustment means.

14. The system, as claimed in claim 11, wherein:

said separation means includes means for rectifying said analog read signal.

15. The system, as claimed in claim 12, wherein:

said amplitude adjustment means includes feedback means for creating a feedback signal based on the symmetry of an output signal of said amplitude adjustment means, said feedback signal being used by said adjustment means to adjust the levels of said positive and negative pulses of said read signal.

16. The system, as claimed in claim 15, wherein:

said feedback means includes peak measurement means for measuring the maximum peak value of said positive and negative pulses in said output signal of said amplitude adjustment means.

17. The system, as claimed in claim 16, wherein:

said feedback means further includes control means for continually receiving said maximum peak value from said peak measurement means and for varying said feedback signal used by said adjustment means until said maximum peak value is substantially minimized.

18. The system, as claimed in claim 16, wherein:

said peak measurement means includes a peak follower circuit.

19. The system, as claimed in claim 1, wherein:

said read signal preconditioning means includes both pulse-to-pulse baseline shift reduction means for reducing the pulse-to-pulse baseline shift of the read signal and pulse asymmetry reduction means for substantially eliminating amplitude asymmetry of said analog read signal.

20. The system, as claimed in claim 1, wherein:

said read signal preconditioning means includes means for receiving said analog read signal from said magnetic head and for reducing a baseline shift component of said analog read signal before said analog read signal reaches said detection means.

21. The systems, a claimed in claim 20, wherein:

said analog read signal comprises positive and negative pulses alternating about a predetermined baseline voltage;

said baseline shift cowponent comprises a positive departure from said predetermined pulse-to-pulse baseline voltage between a positive pulse and a successive negative pulse; and said baseline shift component comprises a negative departure from said predetermined baseline voltage between a negative pulse and a successive positive pulse.

22. A disk drive, comprising:

a magnetic medium for storing data in the form of magnetic polarity transitions;

a magnetic head for sensing said magnetic polarity transitions of said magnetic medium and for creating an analog read signal representative of said traditions, said analog read signal including an undesired pulse-to-pulse baseline shift, wherein a component of the distortion immediately following a positive pulse differs in polarity from a component of the distortion immediately following a negative pulse when the analog read signal is unexposed to other distortions and wherein the component of the distortion immediately following a positive pulse has a substantially constant magnitude which is substantially equal to a magnitude of the component of the distortion immediatley following a negative pulse when the analog read signal is unexposed to other distortions;

detection means for converting said analog read signal into a digital data signal which represents the data originally stored on said magnetic medium; and means for receiving said analog read signal from said magnetic head and for reducing said pulse-to-pulse baseline shift of said analog read signal, said means for reducing including circuitry for linearly processing said analog read signal to reduce said pulse-to-pulse baseline shift.

23. The disk drive, as claimed in claim 22, wherein:

said magnetic head includes one of the following: a magnetoresistive (MR) head, a thin film head, and a ferrite head.

24. The disk drive, as claimed in claim 22, wherein:

said magnetic head includes a magnetoresistive head; and said disk drive further comprises:

biasing means for biasing said head in a nonlinear region of a resistance characteristic for improving the signal to noise ratio of said analog read signal, wherein the amplitudes, with respect to a zero voltage baseline, of the positive and negative pulses of said analog read signal are unequal; and means for equalizing the amplitudes of said positive and negative pulses.

25. The disk drive, as claimed in claim 22, wherein:

said means for reducing said pulse-to-pulse baseline shift includes means for providing low frequency boost to said analog read signal.

26. The disk drive, as claimed is claim 22, wherein:

said means for reducing said baseline shift includes means for providing low frequency phase shift to said analog read signal.

27. The disk drive, as claimed in claim 22, wherein:

said means for reducing said pulse-to-pulse baseline shift includes reactive frequency discrimination means for filtering said analog read signal, said reactive frequency discrimination means having a predetermined frequency response characterized by a first lower level of signal attenuation provided to a first lower range of frequencies in said analog read signal and a second higher level of signal attenuation provided to a second higher range of frequencies in said analog read signal.

28. The disk drive, as claimed in claim 22, wherein:

said means for reducing said baseline shift includes reactive frequency discrimination means for filtering said analog read signal, said reactive frequency discrimination means having a predetermined phase response for providing a phase shift to said analog read signal which is nonlinear with respect to frequency.

29. The disk drive, as claimed in claim 27, wherein:

said reactive frequency discrimination means includes an RC network.

30. The disk drive, as claimed in claim 27, wherein:

said means for reducing said pulse-to-pulse baseline shift further includes amplifier means, coupled to the output of said reactive frequency discrimination means, for amplifying said filtered analog read signal.

* * * * *

UNITED STATES PATENT AND TRADEMARK OFFICE
CERTIFICATE OF CORRECTION

PATENT NO. : 5,943,177
DATED : May 26, 1995
INVENTOR(S) : Mathews et al.

It is certified that error appears in the above-identified patent and that said Letters Patent is hereby corrected as shown below:

Line 54, the word "theiresistance" should be deleted and the words -- the resistance -- should be substituted therefor.

Column 10,
Line 35, the number "1" should be deleted and the number -- 20 -- should be substituted therefor.
Line 46, the number "1" should be deleted and the number -- 20 -- should be substituted therefor.

Column 11,
Line 53, before the word "baseline" insert -- pulse-to-pulse --.
Line 61, the word "cowponent" should be deleted and the word -- component -- should be substituted therefor.
Line 62, the language "pulse-to-pulse" should be deleted.

Column 12,
Line 6, the word "traditions" should be deleted and the word -- transitions -- should be substituted therefor.

Signed and Sealed this

Twenty-first Day of August, 2001

*Attest:*

*Attesting Officer*

NICHOLAS P. GODICI
*Acting Director of the United States Patent and Trademark Office*